March 1, 1955
E. R. BARRETT
2,703,184
REFUSE TRUCK
Filed Dec. 29, 1950
6 Sheets-Sheet 1
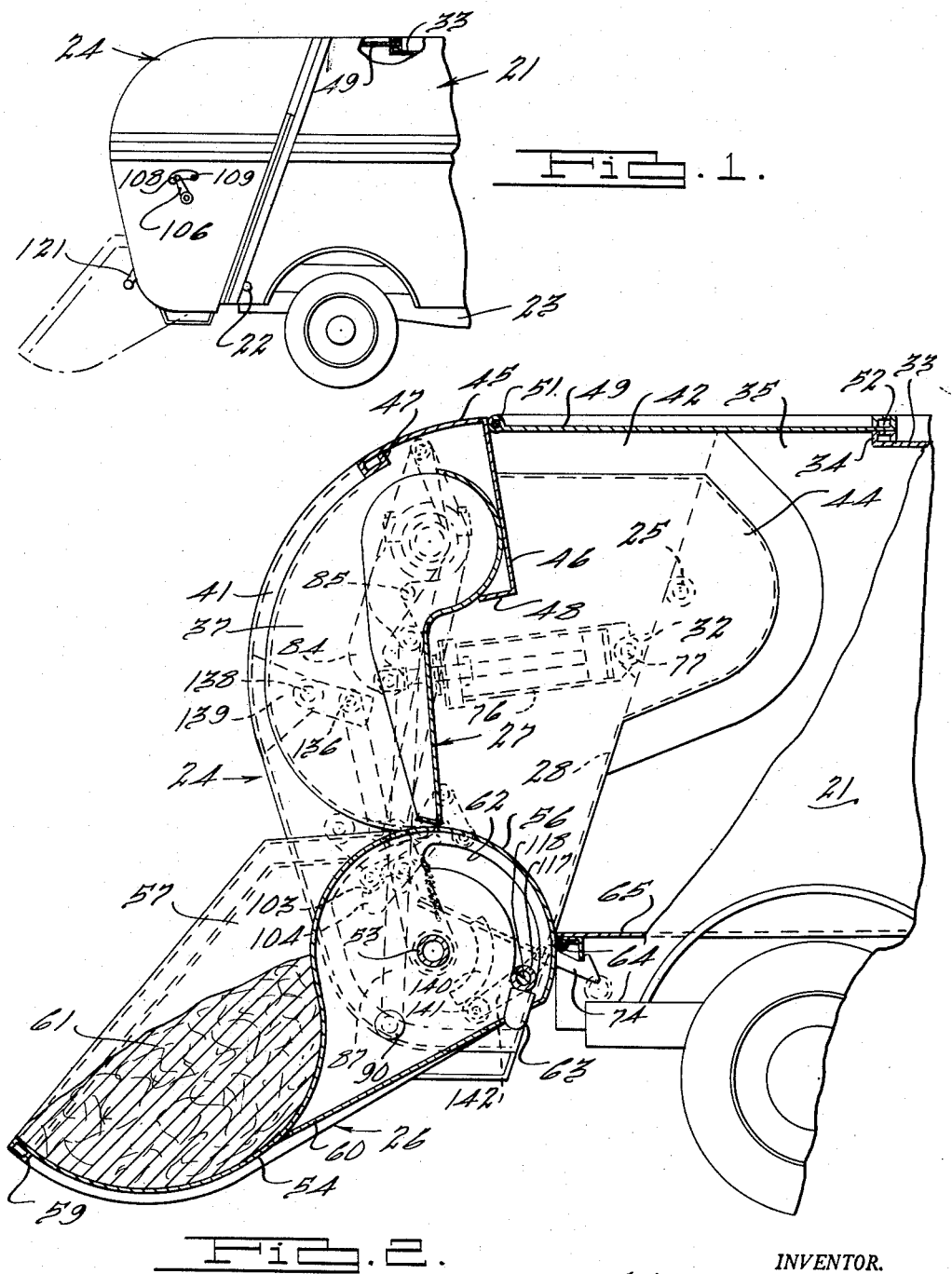
INVENTOR.
Edward R. Barrett
BY
Harness, Dickey & Pierce
ATTORNEYS

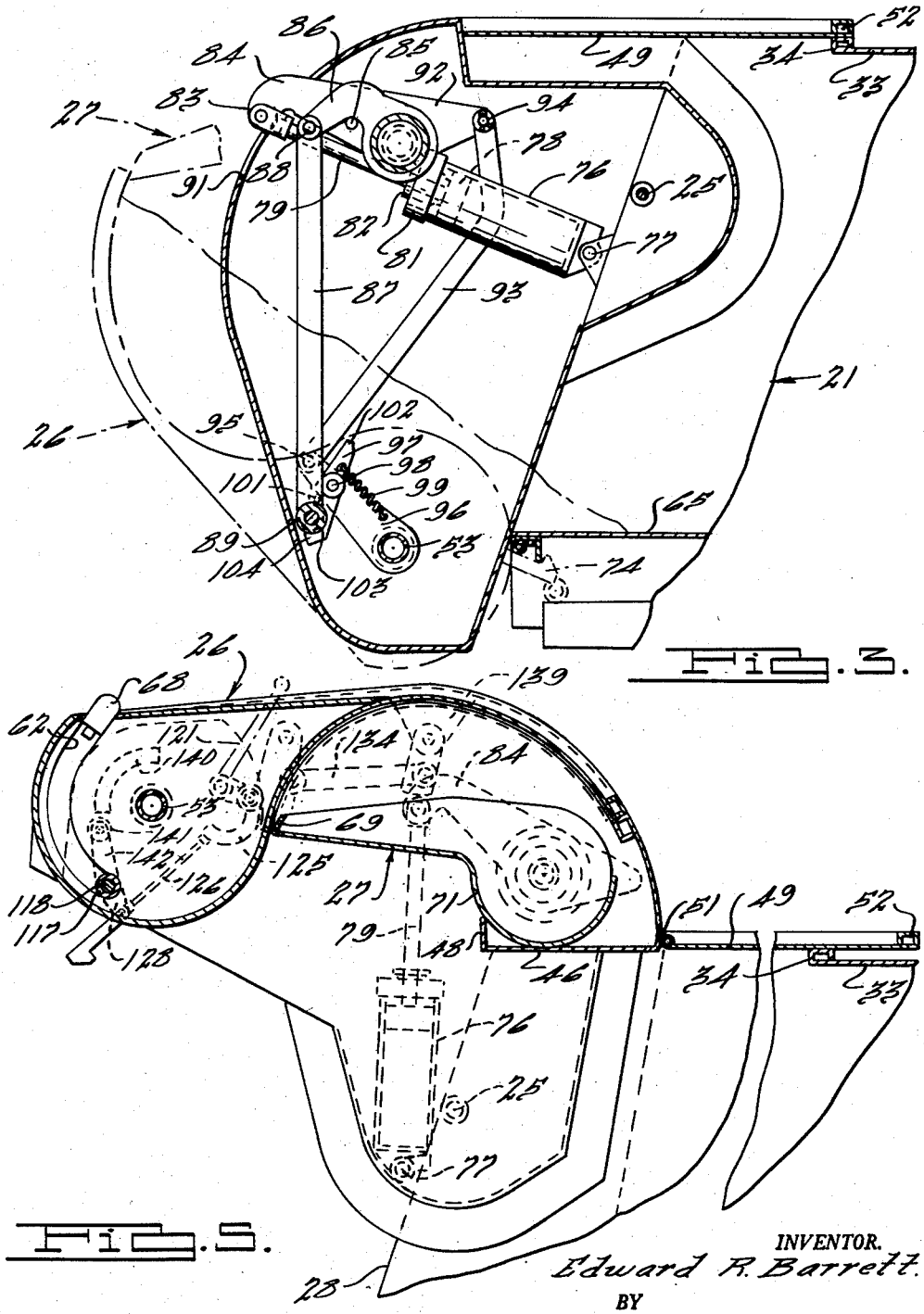

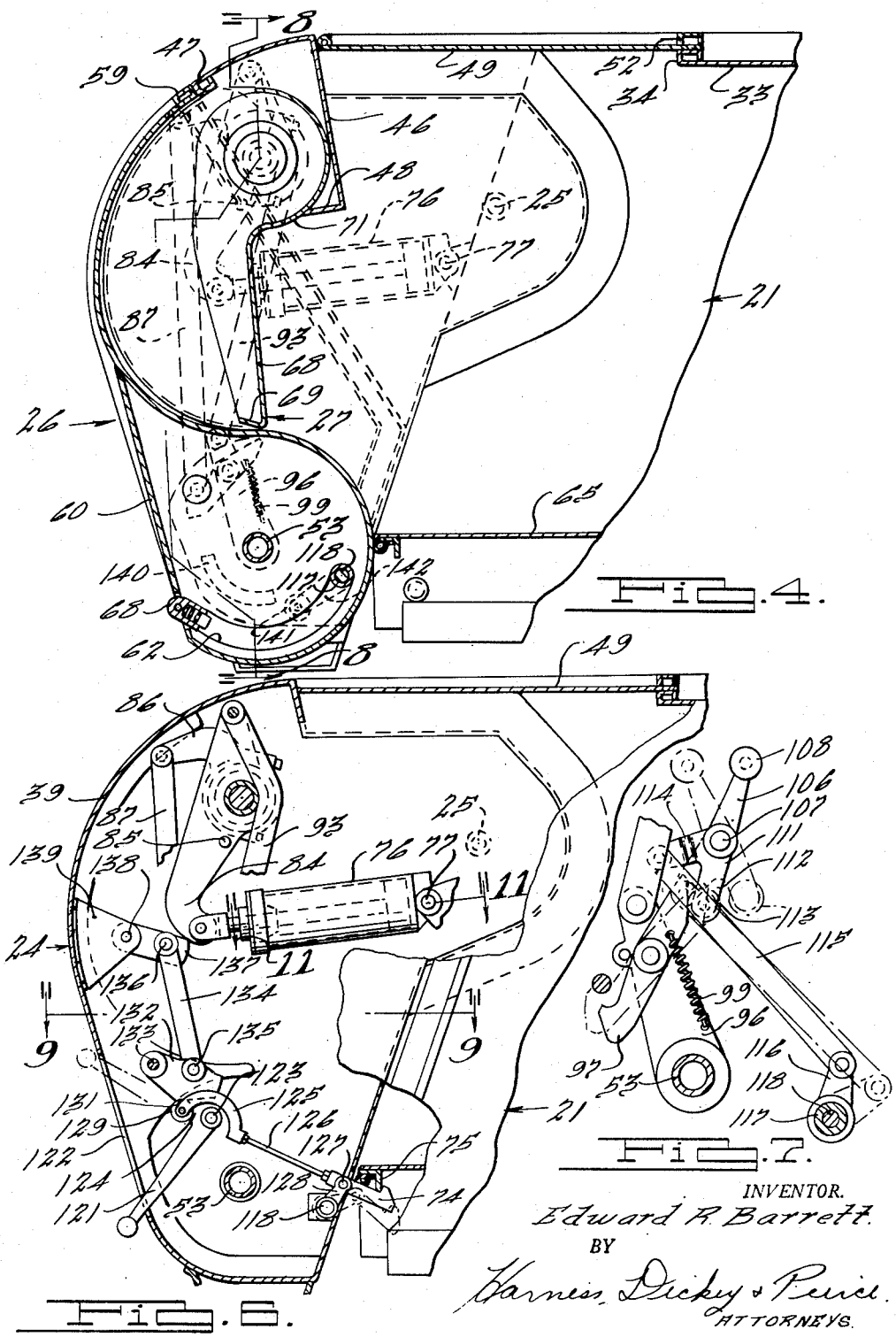

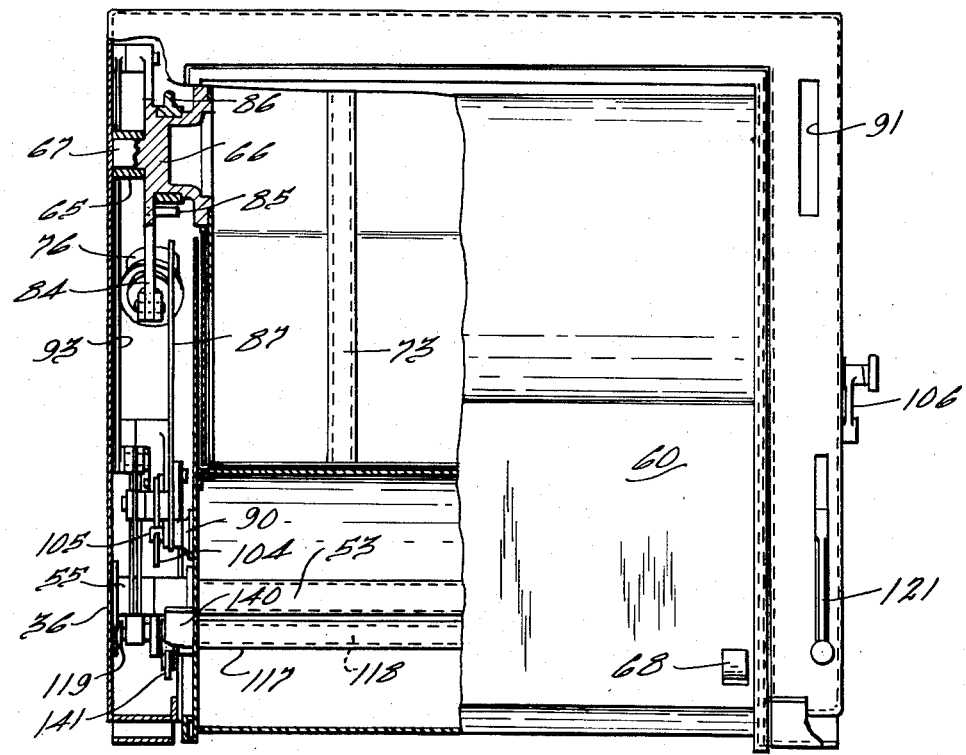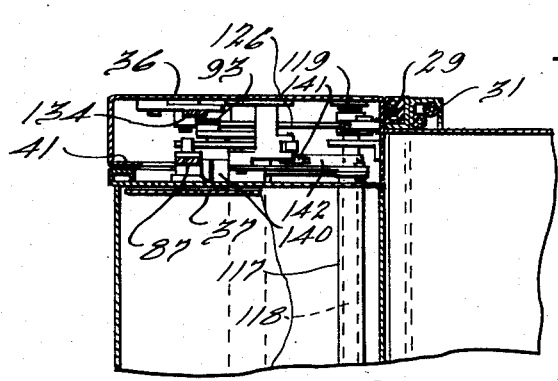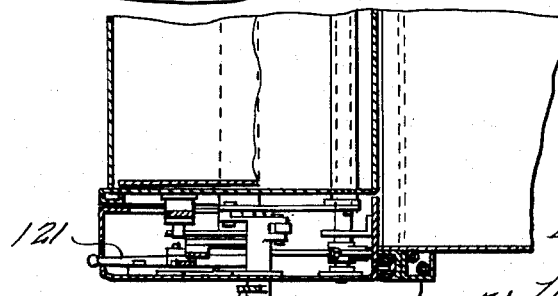

March 1, 1955  E. R. BARRETT  2,703,184
REFUSE TRUCK

Filed Dec. 29, 1950  6 Sheets-Sheet 5

INVENTOR.
Edward R. Barrett.
BY
Harness, Dickey & Pierce.
ATTORNEYS.

March 1, 1955 E. R. BARRETT 2,703,184
REFUSE TRUCK
Filed Dec. 29, 1950 6 Sheets-Sheet 6

INVENTOR.
Edward R. Barrett
BY
Harness, Dickey & Pierce.
ATTORNEYS.

United States Patent Office 2,703,184
Patented Mar. 1, 1955

2,703,184

REFUSE TRUCK

Edward R. Barrett, West Dearborn, Mich., assignor to Gar Wood Industries, Inc., Wayne, Mich., a corporation of Michigan Application December 29, 1950, Serial No. 203,242

26 Claims. (Cl. 214—503)

This invention relates to refuse carrying vehicles and more particularly to vehicles having self-loading means whereby refuse or similar loose material may be systematically loaded into one end portion of the body, moved or compressed into the body by power actuated means, and later dumped from the body.

In the past, self-loading vehicles of the type described have been proposed in which the refuse is loaded through a door or hopper at the rear portion of the vehicle body and is thereafter compressed into the forward portion by a power actuated ramming device. Several important problems are presented when designing a device of this type, and it is a general object of the present invention to effectively meet these problems as well as to overcome several of the disadvantages inherent in prior constructions. One of the most important problems is to achieve a construction in which loading of the refuse may be continued over a longer period of time so as to minimize the time used in dumping operations. This requires not only a longer truck body for greater capacity, but also makes desirable a higher weight per cubic yard of the refuse when the truck is fully loaded. Another problem in the construction of such a refuse loading vehicle is that the different operations, such as lifting the load into compressing position, compressing the load, lifting the end gate for dumping and lifting the truck body to dump the load, makes necessary a rather complicated arrangement of power actuated parts, thus increasing the cost of construction.

It is an object of the present invention to overcome these problems and disadvantages of previous devices by providing a mechanism having a novel principle of operation which substantially increases the loading capacity and at the same time greatly simplifies the construction and reduces the number of power actuated elements. More particularly, it is an object to provide a refuse truck as described in which the operative movement of the ram or compressing panel will first cause a briquetting action, tending to compress the load into compact form, and thereafter assume a horizontal line of action, forcing the briquetted refuse toward the forward end of the body so as to force the material into the most remote spaces of the truck.

It is another object to provide a refuse truck as described which is operated by hydraulic means, and in which a single set of uniformly movable hydraulic cylinders are used for the loading movement, the compressing or ramming operation, and for lifting the end gate when it is desired to dump the refuse. Furthermore, it is an object to minimize the amount of power necessary to compress the refuse providing a smaller compressing panel compressing area, by allowing the compressing panel to be aided by gravity during the compressing stroke, and by avoiding the building up of a "pyramid" of material within the body which resists the movement of the subsequent refuse.

It is a further object to provide a refuse truck as described having a loading hopper which is movable between a lower position for receiving the refuse and an upper position for loading the refuse, and which when in its upper position effectively encloses the refuse within the truck so as to prevent any leakage of material. In association with this object, it is within the contemplation of this invention to provide a ramming or compressing device which cooperates with the hopper to effectively remove all of the refuse held by the hopper, and prevents any material from dropping back into the hopper when the latter is dropped again into receiving position.

Other objects, features, and advantages of the present invention will become apparent from the subsequent description taken in conjunction with the accompanying drawings.

In the drawings:

Figure 1 is a side elevational view of the rear portion of a refuse truck embodying the features of this invention, parts being broken away for clarity;

Fig. 2 is an elevational view, partly in cross-section showing the operative portions of the mechanism with the hopper in receiving position;

Fig. 3 is a view similar to that of Fig. 2 but with the section taken adjacent the loading and compressing linkage, and showing the hopper midway between its receiving and its loading positions;

Fig. 4 is a view similar to Fig. 2 but with the hopper in its loading position;

Fig. 5 is a view similar to Fig. 2, but with the end gate and its associated mechanism in dumping position prior to tilting of the truck body, and showing the interlocking mechanism in its end gate lifting position;

Fig. 6 is an elevational view with portions of the side plates broken away, showing the interlocking mechanism for the end gate in its end gate locking position;

Fig. 7 is a detail view of the hopper pawl tripping mechanism;

Fig. 8 is a rear view of the loading assembly, partly in cross-section along the line 8—8 of Fig. 4 to show the mounting of the compressing panel and the operating linkage for the compressing panel and hopper;

Fig. 9 is a plan cross-sectional view taken along the line 9—9 of Fig. 6 and showing the connecting means between the linkages on opposite sides of the end gate;

Figure 10:
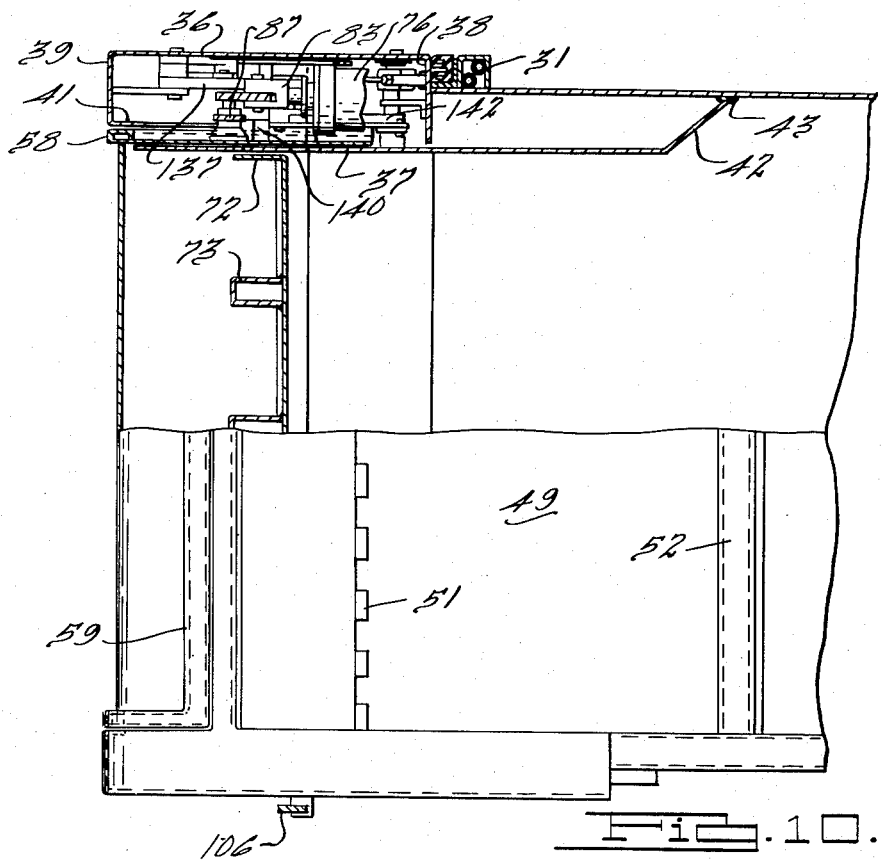
Fig. 10 is a plan view of the top of the mechanism, with a portion broken away to show the relation of the end gate to the truck side panels.

The loading mechanism of this invention is adapted to be installed at the rear end of an enclosed truck body 21 designed to receive and dump refuse or similar loose material. The truck body is pivoted at 22 to the chassis 23 of the vehicle and may have the conventional hydraulically operated tilting mechanism (not shown) for lifting the forward end of the body when dumping the refuse. The loading mechanism comprises in general an end gate 24 pivotally supported by the truck body at 25 for movement about a horizontal axis, a movable hopper 26 and a ram or compressing panel 27 mounted on the end gate, and an actuating mechanism for these parts enclosed within the opposite side portions of the end gate. The actuating mechanism is preferably driven by electro-hydraulic means which may be controlled by a power take-off unit (not shown) driven by the engine. It may be stated generally at this point that when in operation the hopper 26 is movable between a lower or material-receiving position as shown in Fig. 2 and an upper or loading position as shown in Fig. 4; the compressing panel 27 is movable between a retracted position as shown in Fig. 3 and a compressing position as shown in Figs. 2 and 4; and the end gate 24 is movable between a closed position as shown in Figs. 2, 3 and 4 and a dumping position as shown in Fig. 5.

The rear end of the truck body 21 has rearwardly and downwardly sloping side edges 28. As seen for example in Fig. 9, these edges are provided with rubber sealing strips 29 which cooperate with the adjacent portions of end gate 24. Also extending along these side edges are channel-shaped housings 31 which enclose hydraulic lead lines or risers for the operating mechanism, and disposed at intermediate points along these side edges are supporting lugs 32 to which are connected the hydraulic actuating cylinders. The roof 33 of the truck body does not extend as far rearwardly as do the side plates, and the rear edge of the roof is provided with a channel-shaped reinforcing piece 34.

The end gate 24 consists primarily of two semi-enclosed side housings parallel to and pivotally supported by the side walls 35 of the truck. Each of these housings comprises an outer plate 36 and an inner plate 37 in parallel relation, these plates being connected by a forward web 38 which extends between the lower portions of the plates. The rear end of each side housing is provided with a rear plate 39 contiguous with outer side plate 36, and the inner edge of each rear plate carries a guard 41 parallel to plate 36. Rear plate 39 and guard 41 serve to partially enclose and protect the operating mechanism within each side housing and are so shaped as to blend with the contour of hopper 26 when in its closed position. The inner plate 37 of each housing is spaced a slight distance inwardly from guard 41, and each of the side plates of hopper 26, later described in detail, is disposed between its corresponding guard and inner plate when the hopper is closed. The rear edges of the inner plates 37 slightly overlap the forward edges of guards 41 and these edges are of complementary arcuate shape so as to conform to the curvature of the hopper when the latter is in its upper or loading position. The upper edge and the upper portion of the forward edge of each inner plate 37 are provided with a continuous flange or apron 42 which is inclined outwardly from the plane of the inner plate. The outer edge of each of these aprons 42 is substantially flush with the inner surface of its adjacent truck side wall 35. As seen in Fig. 10, a seal 43 may be provided along this outer edge so that when the end gate is moved between its lower and upper positions the inclined apron will protect the operating mechanism within the housing from refuse. The upper portions of inner plates 37 extend forwardly as at 44 to allow ample clearance around pivots 25 during movement of the end gate. A crossover panel comprising a curved upper portion 45 and a web portion 46 connects the upper ends of the end gate side housings. Curved portion 45 is so shaped as to blend with the shape of hopper 26 when the latter is in its upper position, and has a channel-shaped reinforcing member 47 along its rear edge. Web portion 46 extends substantially transversely to portion 45 and has a flange 48 designed to coact with a portion of ram 27 to further protect the operating mechanism against damage by the refuse. A sliding roof plate 49 is hinged at its rear edge 51 to the crossover panel at the juncture of portions 45 and 46. This roof plate extends entirely across the top of the truck and when the end gate is in its lower position the forward edge 52 of the roof plate is supported by reinforcing channel 34.

The end gate is normally latched in its lower position as shown in Fig. 2, in which position the load receiving, load lifting and compressing operations take place. When in this position it will be seen that the side housings are contiguous with side walls 35 of the truck body so that there are no side openings for escape of the refuse. The weight of the roof plate 49 will prevent refuse from leaking from the top of the truck. When it is desired to dump the refuse from the loaded vehicle, the hopper 26 is first moved to its loading position and the compressing panel 27 to its compressing position. The end gate is then moved into its upper position as shown in Fig. 5 by pivotal movement around pivot supports 25. It will be noted that since each side housing is pivoted only to its adjacent side wall 35, there is no pivot bar crossing the rear end of the vehicle to interfere with the dumping operation. When the end gate is raised, the outer edges of aprons 42 will slide against the inner surfaces of body side walls 35, and the roof plate 49 will slide forwardly on support 34, swinging on its hinge 51. When in the upper position, web 46 of the end gate crossover panel will be substantially parallel to the top 33 of the truck and the compressing panel and hopper will be above this level. It will thus be seen that practically the entire rear end of the truck will be open for dumping.

The hopper 26 is pivoted to the end gate between its side housings by a cross rod 53 as seen in Fig. 8, the cross rod being supported by bearings 55 fixed to outer plates 36 at approximately the level of the truck body floor. The hopper comprises a body plate of general S-shape having a bowl or receiving portion 54 and a retaining and sealing portion 56 of oppositely directed concave arcuate shapes, the sealing portion 56 being preferably concentric with the pivot rod 53. Extending from the side edges of the body plate are side retaining plates 57 which, as stated previously, interfit between guards 41 and inner plates 37 of the end gate when the hopper is lifted. The edges of side plates 57 may be provided with reinforcing channels 58 which fit closely between the guards 41 and inner plates 37, and which are flush with rear plates 39 of the end gate when the hopper is in its upper or loading position. An additional reinforcing channel 59 extends across the outer edge of receiving portion 54 and this member abuts channel 47 of the end gate when the hopper is lifted. The hopper is also provided with a shield plate 60 across the concave side of arcuate sealing portion 56 to prevent material from collecting therein. As is best seen in Fig. 2, the side plates 57 are so shaped as to retain a substantial amount of refuse or other loose material 61 within the receiving portion 54 of the hopper. The side plates also have arcuate slots 62 adjacent the sealing portion 56 and concentric with the hopper pivot, and one end of each of these slots is provided with a buffer 63 which is adapted to abut a stationary portion of the mechanism when the hopper is dropped, in a manner to be later described.

The curved extent of sealing portion 56 of the hopper body plate is such that when the hopper is in its lower or receiving position the sealing portion contacts a rubber seal 64 disposed along the rear edge of the truck floor, thus preventing leakage of refuse from the truck body. When the hopper is lifted, the sealing portion 56 will sweep across seal 64, and the refuse 61 will be lifted until the hopper occupies a position as shown in Fig. 3. During this movement the side plates 57 of the hopper will enter between guards 41 and inner plates 37 of the end gate, the lateral spaces between the inner plates and the hopper side plates being so small as to prevent entrance of refuse within the end gate side housings. When the hopper reaches such a position that the center of gravity of the refuse overrides the uppermost point of retaining and sealing portion 56, the refuse will begin to flow into the truck body. During the period of movement from the position shown in Fig. 3 to the fully closed position shown in Fig. 4, the compressing panel 27, which has been lifted into its retracted position during the first portion of the hopper lifting movement by means later described, sweeps out the receiving portion 54 of the hopper so that when the hopper reaches its fully closed or loading position there is no refuse left in the receiving portion. When in its loading position the reinforced edge 49 of the hopper will abut edge 47 of the end gate crossover panel and side edges 58 of the hopper will be flush with the rear flanges 39 of the end gate, thus entirely enclosing the refuse within the truck.

The compressing panel 27 is pivotally supported at the upper portion of the end gate between the side housings thereof by means best shown in Fig. 8. This supporting means comprises a pair of bearings 65 which are secured to outer plates 36, and a pair of extensions 66 secured to the opposite sides of the packer and having journal portions 67 supported by the bearings. The compressing panel consists primarily of a panel 68 having a flanged lower edge 69, an arcuate upper portion 71, and side flanges 72 which are flush with the inner surfaces of inner plates 37 of the end gate. Compressing panel 68 may also be provided with a plurality of vertically extending reinforcing ribs 73. As stated previously, the compressing panel is movable between an upper or retracted position as shown in Fig. 3 in which the edge 69 is adjacent outer edge 59 of the hopper when the latter is partially lifted, and a lower or compressing position as shown in Fig. 4 in which the lower edge 69 is adjacent the hopper and sealing portion 55. As will be noted, when in its retracted position the compressing panel 68 is substantially horizontal, thus allowing a maximum amount of refuse to be received beneath it. When moving toward its compressing position the flanged edge 69 will sweep across along the surface of the hopper receiving portion 54, the actuating linkage and the shapes of the parts being constructed specifically for this purpose. The initial movement of the compressing panel will be substantially in a downward vertical direction and this movement will gradually change to a horizontal motion, the compressing panel assuming a substantially vertical position at the end of its stroke. This action will tend to first compress or briquette the refuse, and then move the briquetted load toward the forward end of the truck. As will be noted in Fig. 4, the lower edge 69 of the compressing panel when in its lower position is spaced a substantial distance above the floor of the truck body. This is important since during a normal loading sequence a static mass of material will accumulate along the bottom of the truck over which the later refuse must be moved. It will also be observed that during the movement of the compressing panel, curved portion 71 will ride along the edge of flange 48 of the end gate cross panel thus preventing refuse from leaking out above the compressing panel.

It will be apparent from the above description that the loading mechanism thus far described is capable of two mutually exclusive operational sequences, the first of these being the material-receiving, material-loading and material-compressing sequence, and the second being the end gate opening sequence prior to dumping the load. During the first-mentioned sequence of operations, the end gate 24 itself does not move relative to the truck body 21 but rather is secured in its lower position by means of hooks 74 mounted on the gate and latched to an angle bar 75 or similar member extending across the lower rear edge of the truck body. The mechanism for carrying out the loading and compressing sequence is entirely enclosed within the two side housings of the end gate and is preferably powered by hydraulic fluid carried through risers disposed within channel-shaped housings 31. It will be understood, however, that the principles of this invention contemplate the use of power sources other than those in the illustrated embodiment.

The actuating mechanism for the loading sequence in each of the end gate side housings is substantially identical, and the mechanism in only one of the housings will therefore be described. As best seen in Figs. 2, 3 and 8, a hydraulic cylinder 76 is pivotally mounted at one end 77 to lug 32 which is secured to the rear side edge 28 of the truck body. A piston 78 is slidably disposed within cylinder 76 and, as will later appear, the hydraulic system is so arranged that the piston may be driven in either direction within the cylinder. Piston rod 79 extends outwardly of the cylinder through cylinder head 81, a packing gland 82 being provided in the head. A clevis 83 at the outer end of the piston rod is pivotally attached to the outer end of a curved rocker arm 84 which is integral with extension 66 of the ram 27. It will be seen therefore that when the piston is driven from the forward end 77 to the rear end 81 of the cylinder, rocker arm 84 will be rotated in a clockwise position as seen in Figs. 2 and 3, thus moving compressing panel 68 from its lower to its upper position. Arm 84 has extending transversely therefrom a dog comprising a pin 85, and during the clockwise movement of the arm this pin is engageable with a floating arm 86 which is rotatably mounted on extension 66 and extends in a plane parallel to that of arm 84. A link 87 is pivotally attached at its upper end 88 to the outer end of arm 86 and at its lower end 89 to an extension 90 secured to the side plate 57 of the hopper 26. Extension 90 is radially spaced from hopper pivot rod 53 and as seen in Fig. 2, is so disposed that an upward force on link 87 will cause a clockwise or upward rotation of the hopper. It will thus be seen that when piston 78 is driven rearwardly both compressing panel 27 and hopper 26 will be rotated in a clockwise direction from the position shown in Fig. 2 to that shown in Fig. 3. The proportions of the parts are such that when the piston 78 has reached the end of its stroke the lip 69 of the compressing panel will have reached the edge 59 of the hopper. A clearance aperture 91 may be provided in the rear plate 39 of the end gate side housing to allow the piston rod to reach the end of the stroke. An arm 92 integral with compressing panel extension 66 extends in the direction opposite that of arm 84, and a link 93 is pivotally secured at its upper end 94 to the arm 92. Link 93 is longitudinally bent so as to clear extension 66, and the lower end 95 of this link is pivotally attached to a pawl arm 96 which in turn is rotatably secured to hopper pivot rod 53 outwardly of link 87. A pawl 97 is pivoted at its midpoint 98 to an intermediate portion of arm 96 and is urged in a clockwise direction by a tension spring 99 secured between the pawl and the pawl arm. A stop 101 on the arm limits the clockwise rotation of pawl 97. The pawl comprises a toe 102 extending upwardly and forwardly when the pawl is in its clockwise limiting position and a hook portion 103 at the rear end of the pawl. It will be seen that when arm 84 is rotated clockwise by the rearward movement of piston 78, arm 92 will likewise rotate in a clockwise direction, thus rotating pawl arm 96 in a counterclockwise direction.

During operation of the mechanism in its loading and compressing sequence, the hopper 26 will initially be in its lower or receiving position as shown in Fig. 2. Upon application of hydraulic pressure to the forward end 77 of cylinder 76, arms 84 and 92 will be rotated clockwise, and engagement of pin 85 with arm 86 will cause clockwise rotation of the hopper. The crank arrangement is such that the initial movement of compressing panel 27 will be relatively rapid while that of hopper 26 will be relatively slow. In this manner, the compressing panel will be clear of the material 61 by the time the hopper reaches its intermediate position shown in Fig. 2. When this position is reached, the counterclockwise rotation of pawl arm 96 and the simultaneous clockwise movement of hopper extension 90 will cause pawl face 104 adjacent hook 103 to engage a catch 105 at the outer end of extension 90. This engagement will cause pawl 97 to rotate counterclockwise against the action of spring 99, and hook 103 will move into engagement under catch 105, as shown in Fig. 2. Means are provided, as will be later described, for automatically reversing the motion of piston 78 when it reaches the rearward end of its stroke. Upon forward motion of the piston, arms 84 and 92 will be rotated counterclockwise. Pin 85 will thus leave floating arm 86, and arm 92 will pull link 93 upwardly. Since pawl 97 engages catch 105, this will cause further clockwise movement of hopper 26, the floating arm 86 maintaining an idle clockwise movement. At the same time, the counterclockwise motion of arm 84 will cause extension 66 and therefore compressing panel 27 to rotate counterclockwise. The configuration of receiving portion 54 of the hopper and the linkage arrangement are such that, as mentioned previously, lip 69 of the compressing plate 68 will sweep across receiving portion 54 thus forcing the material forwardly into the truck body. In its final position, as shown in Fig. 4, lip 59 of the hopper will abut edge 47 of the end gate and the rear end of the truck will be entirely enclosed.

Since it may be desirable in some cases for hopper 26 to be automatically released when in its uppermost position so as to drop immediately into receiving position, means are provided whereby the mechanism may be selectively adjusted to achieve this result. As best seen in detail in Fig. 7, this means comprises a tripping mechanism for pawl 97 when the latter reaches its final position. This tripping mechanism comprises an arm 106 pivotally mounted at 107 to outer plate 36 of one of the end gate side housings. Arm 106 is movable between a tripping and a non-tripping position by means of a handle 108 engageable in detents 109 in the end gate to hold the arm in either position. A forked member 111 is mounted within the side housing and is movable with arm 106. One arm 112 of this forked member has mounted at its outer end a tripping roller 113. When arm 106 is rotated to its forward or tripping position (the solid lines as shown in Fig. 7) roller 113 will be in the path of toe 102 of pawl 97. When the latter reaches its uppermost position the pawl will therefore be rotated in a counterclockwise direction, releasing catch 105 and allowing the hopper to drop into its receiving position. When the arm 106 is in its rearward or non-tripping position, roller 113 will be out of the path of the pawl toe, and the hopper will thus be held in its upper position until arm 106 is moved forwardly. The other arm 114 of forked member 111 has pivoted thereto a link 115 connected to a crank 116, the crank being attached to a tubular shaft 117 extending entirely across the lower portion of the end gate. Shaft 117 is supported by a concentric solid shaft 118, shaft 118 being in turn supported at its opposite ends by bearings 119 secured to the outer plates 36 of the side housings. Shaft 117 serves to transmit the motion of arm 106 to a pawl mechanism within the opposite side housing which is identical in structure and function to the mechanism previously described. The shafts 117 and 118 are disposed within the arcuate slots 62 of the hopper, and when the hopper drops into its lower position buffers 63 will abut these shafts, thus absorbing the inertia of the hopper.

Interlocking means are provided for releasing end gate 24 from its lower latched position and allowing the gate, together with its supported parts to be swung upwardly into the dumping position shown in Fig. 5. This interlocking means, which is best shown in Figs. 5 and 6, is controlled by a handle 121 which extends rearwardly from one of the end gate side housings through a slot 122 and is pivotally supported by a pin 123 secured to the side housing outer plate. Handle 121 has a crank arm 124 integral therewith, and a link 125, longitudinally bent to clear pin 123, is pivoted to crank arm 124 and extends forwardly and downwardly therefrom. A rod 126 is secured at one end to link 125 and at its opposite end to gate hook 74 which, as stated previously, engages cross bar 75 to latch the end gate in its lower position. Hook 74 is pivotally supported at an intermediate point 127 by a crank arm 128 which is attached to one end of cross shaft 118. As stated previously, this cross shaft extends to the opposite side of the end gate, and the shaft serves to operate an interlocking mechanism on that side which is identical with the mechanism adjacent handle 121. Also mounted on crank arm 124 laterally adjacent link 125 is a roller 129. This roller is in supporting contact with the roller cam surface 131 of a cam arm 132 which is pivotally supported at its rearward end 133 by the housing. A link 134 is pivotally connected at its lower end 135 to cam arm 132 and at its upper end 136 to an end gate lifting bar 137. The lifting bar is pivotally mounted at its rearward end 138 to the end gate by means of a forwardly extending bracket 139 attached to rear plate 39. The lateral position of arm 137 is such that it is substantially in the same plane as the outer end portion of clevis 83. As stated previously, an identical linkage arrangement and lifting bar is found in the opposite end gate side housing, which is operated by handle 121 through shaft 118.

In operation, handle 121 is movable between a lower or end gate latching position and an upper or end gate releasing position. In the lower position, as seen in Fig. 6, link 125 and hook 74 are moved rearwardly, and the finger of the hook engages cross bar 75, thus locking the end gate in its closed position. Simultaneously with this movement, roller 129 will move to the rear portion of cam surface 131, and cam arm 132 will be lowered, thus lowering the end gate lifting bar 137 out of the path of clevis 83. It will thus be seen that when the end gate is locked, it will be imposible for the power actuated means to directly engage any portion of the end gate, and the hydraulic cylinders will thus act only on hopper 26 and ram 27. When handle 121 is lifted into its upper position, as shown in Fig. 5, gate hook 74 will be thrown forwardly and downwardly, releasing the end gate for pivotal movement. At the same time, roller 129 will be lifted forwardly and upwardly, thus moving the end gate lifting bar 137 into the path of clevis 83. Actuation of the piston 78 will thus transmit force directly to the end gate side housing through brackets 139. Since the line of force is below the pivot points 25 of the end gate, this force will rotate the end gate clockwise into its upper or dumping position. It will be observed that the lifting bar 137 cannot be aligned with the clevis unless the piston is in its retracted position. It will also be noted that when the end gate is released, it is impossible to actuate hopper 26 or compressing panel 27 by the power-actuated means, since the force from the hydraulic cylinders is transmitted directly to the end gate and is not permitted to move the hopper or compressing panel relative to the end gate. Upon rotative movement of the end gate, sliding roof plate 49 will slide forwardly along its support 34, and when the end gate is in its uppermost position, cross piece 46 will be in substantial alignment with the roof plate.

To prevent releasing of the end gate when hopper 26 is not fully raised, an interlock is provided comprising an arcuate cam 140 fixed to one hopper side plate 57 and concentric with its pivot axis. Cam 140 is so positioned that it engages roller 141 of an arm 142, fixed to shaft 118, whenever the hopper is away from its loading position, but is clear of the arm when the hopper is fully raised. This will prohibit rotation of shaft 118 and therefore releasing of hooks 74 except when the hopper is raised, thus preventing accidental lifting of the end gate when the hopper extends rearwardly of the truck.

Figure 11:
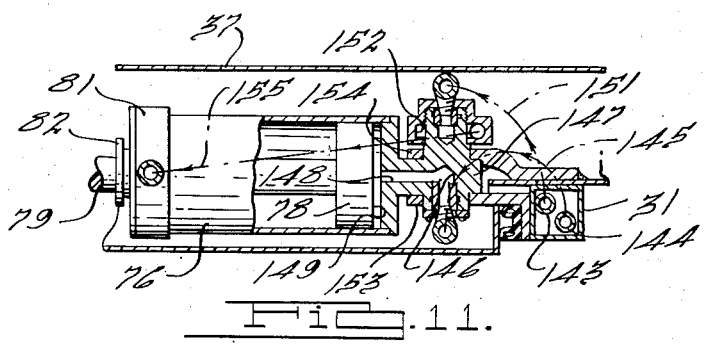
Fig. 11 is a detail view of one of the hydraulic actuating cylinders and its associated parts.
Figure 12:
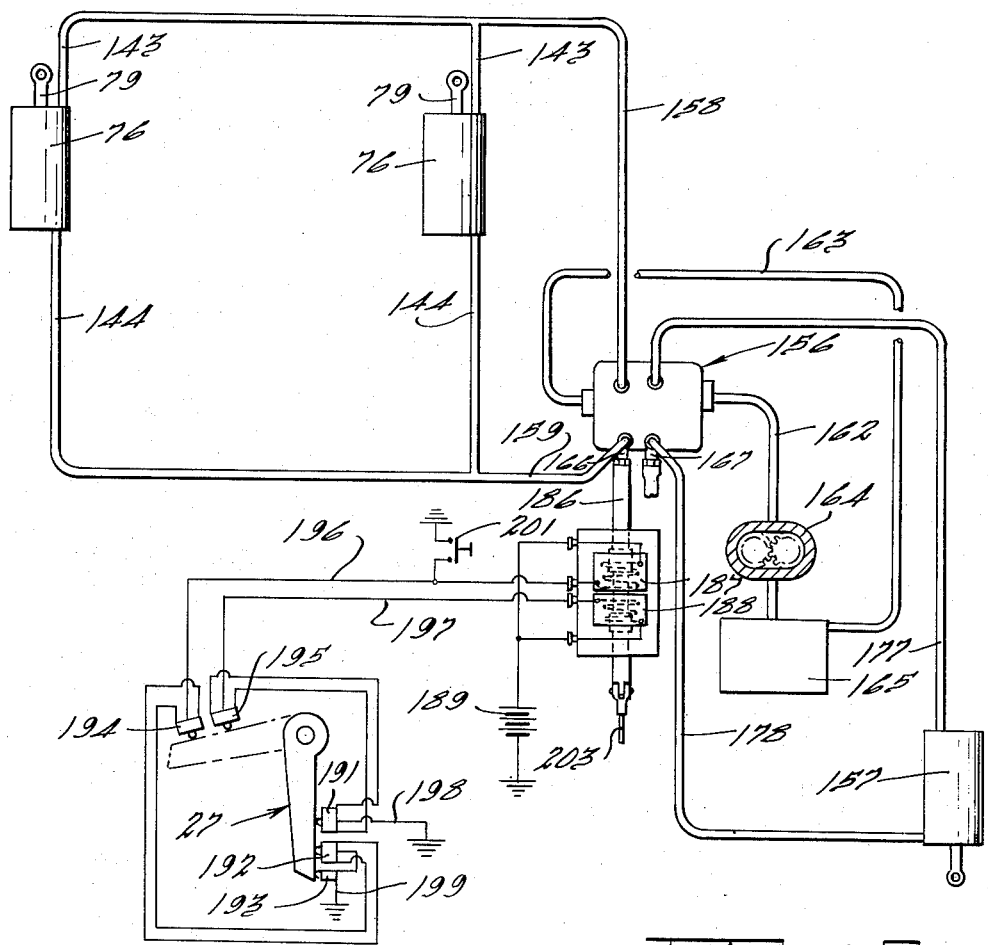
Fig. 12 is a schematic layout of the electro-hydraulic operating system for the loading mechanism and for the truck body.

The electrohydraulic means for carrying out the various operational steps is shown schematically in Fig. 12. It will be understood that while the illustrated embodiment of this control system is that which is preferred, the principles of this invention contemplates the use of any suitable control means for carrying out the operations described. The purposes of the control system are, in general, to provide manual means for initiating the rearward movement of pistons 78, to automatically return the pistons from their extended to their retracted position when a loading and compressing sequence is being carried out, or alternatively to hold the pistons in extended position when the end gate is being lifted for dumping. As shown in Fig. 11, the pivotal support for each cylinder 76 may have integral therewith connections which lead the fluid from hydraulic risers 143 and 144 enclosed within channel housing 31, to opposite ends of the cylinder. In particular, a flexible connection indicated schematically at 145 may lead from riser 144 to an axial aperture 146 in the trunnion 147, a port 148 leading therefrom to the forward face 149 of the piston. Likewise, a flexible connection 151 leads from riser 143 to an annular channel 152 secured to the trunnion, the latter being rotatably supported by spaced trunnion brackets 153 and 154. A line 155 connects annular channel 152 to the rear end of the cylinder. Thus, when hydraulic pressure is created in riser 144, the piston 78 will be driven rearwardly, and when pressure is created in riser 143, the piston will be driven into its forward or retracted position.

Figure 13:
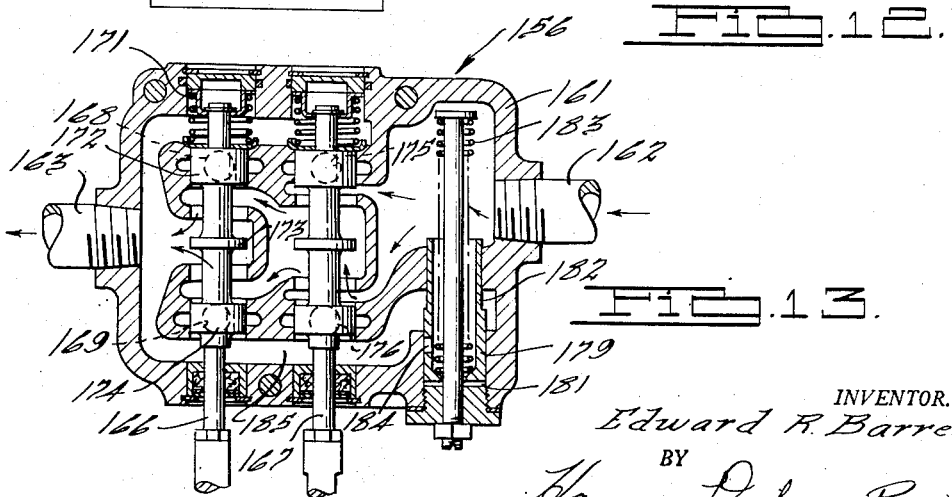
Fig. 13 is a detailed cross-sectional view of a preferred control valve assembly for the hydraulic system.

A valve mechanism indicated generally at 156 is used to control the fluid pressure in lines 143 and 144, and in the illustrated embodiment this mechanism also controls the truck body lifting jack 157, although it will be understood that the latter jack may be operated by separate means if desired. The valve mechanism 156 may be mounted at any suitable place on the truck chassis, and is connected by lines 158 and 159 to risers 143 and 144 respectively. As shown in detail in Fig. 13, the valves are enclosed within a unitary housing 161 to which is connected an inlet line 162 and a recirculating line 163. The inlet line may lead from a pump 164 which draws hydraulic fluid from a tank 165 and is driven by engine power take-off means (not shown). Recirculating line 163 leads from housing 161 back to tank 165. The valves themselves may be of the reciprocating type and comprise a valve 166 for controlling the cylinders 76 and a valve 167 for controlling the body jack. Valve 166 controls two ports 168 and 169, the first of these ports leading to line 158 and thence to risers 143 for retracting the pistons 78, and the second port 169 leading to line 159 and risers 144 for extending these pistons. The valves 166 and 167 are normally held in a neutral position as shown in Fig. 13 by springs 171. When the valve 166 is moved downwardly against the action of its spring, portion 172 of the valve will prevent fluid from entering port 168, and portion 173 will prevent fluid from flowing into the recirculating line 163. Portion 174 of the valve will uncover port 169, allowing the fluid to flow to risers 144, extending pistons 78. Likewise, when the valve 166 is moved upwardly from its neutral position against the spring action, only port 168 will be uncovered, retracting the pistons. Valve 167 controls ports 175 and 176 which lead respectively to lines 177 and 178 for controlling the body jack 157. A relief valve 179 may be provided in the valve housing to allow the fluid to flow to recirculating line 163 when the pistons reach their limiting positions, the pressure rise in space 181 causing sleeve 182 to lift against spring 183 so as to connect port 184 to the discharge space 185.

The means for controlling the movement of valves 166 and 167 may be either manual or automatic. In the illustrated embodiment, both manual and automatic means are shown for controlling valve 166 and only manual means for valve 167. The automatic control means for valve 166 will ordinarily be used during a loading and compressing operation, and the manual means when it is desired to lift the end gate for dumping. As shown schematically in Fig. 12, a movable core 186 is connected to valve 166 and is actuated in opposite directions by two solenoids 187 and 188. Specifically, solenoid 187 is arranged so as to move valve 166 into its downward or piston-extending position, and solenoid 188 so as to move the valve into its upper or piston-retracting position. These solenoids are energized from vehicle battery 189 and are controlled by a plurality of switches appropriately mounted on the end gate 24. Three of these switches 191, 192 and 193 are actuated by a portion of the compressing panel 27, shown schematically in Fig. 12, when the latter is in its lower or compressing position. Switches 194 and 195 are actuated by the compressing panel when in its uppermost or retracted position. Switches 192 and 194 are of a conventional three-way snap-acting type and together control the energization of piston-extending solenoid 187 through a lead 196. Switches 191 and 195 are likewise of the three-way snap-acting type and control piston-retracting solenoid 188 through a lead 197. The ground connection for the piston-retracting solenoid circuit is made directly by a lead 198, but the ground connection 199 for the piston-extending solenoid passes through switch 193 which is of the two-way plunger type and is opened whenever compressing pannel 27 reaches its lower position. Thus switch 193 acts as a stop switch and prevents a recycling of the mechanism when the hopper and compressing panel have completed a loading and compressing sequence. A push-button starting switch 201 which may be mounted adjacent the other control elements, by-passes switch 193 to ground and is actuated to start the loading and compressing sequence.

In operation, the mechanism will start a loading and compressing sequence with the compressing panel 27 in its compressing position as shown by the solid lines in Fig. 12. The setting of snap switches 191 and 195 will be such that solenoid 188 is deenergized, but the setting of switches 192 and 194 will be such as to normally energize solenoid 187. However, the circuit to this latter solenoid will be kept open by the plunger switch 193. Upon pressing of push button switch 201, the circuit to solenoid 187 will be completed and valve 166 will be moved downwardly from its neutral position, extending piston rods 79. When the compressing panel 27 reaches its retracted position snap switches 194 and 195 will be actuated, thus deenergizing solenoid 187 and energizing solenoid 188. This will instantly move valve 166 into its upper position, driving the pistons 78 back to their forward or retracted position. When the ram again reaches its compressing position snap switches 191 and 192 will be actuated, again reversing the solenoid circuits. However, the opening of switch 193 will prevent recycling of the mechanism, and valve 166 will return to its neutral position. When it is desired to lift the end gate 24 for a dumping operation, link 186 may be manually actuated by a rod 203 so as to move valve 166 into its lower or piston-extending position. Actuating rod 203 may be controlled from the cab of the truck or from any other desired location.

In order to more clearly understand the operation of the entire mechanism as well as the interrelation of the above-described systems and linkages, a complete sequence of loading, compressing and dumping operations will now be described. Assuming that it is desired to load and compress a large amount of refuse or other material at a single location, the mechanism will be so adjusted as to automatically drop the hopper 26 into its receiving position after each loading and compressing cycle is completed. Arm 121 will first be moved into its lower position so as to engage gate hooks 74 to the truck body and drop gate lifting bars 137 into inoperative position. Handle 106 will then be moved into its forward or tripping position as shown in Fig. 7. This will serve to trip pawls 97 if they are holding the hopper in its upper position, and the hopper will drop into its receiving position shown in Fig. 2. It will be noted that in this position the rear end of the truck body will still be substantially enclosed due to the position of compressing panel 27. Refuse or other material 61 is then loaded into hopper receiving portion 54. Upon actuation of starting switch 201 hydraulic fluid will flow into cylinders 76 extending piston rods 79. The hopper and compressing panel actuating linkage described in detail above will move these elements into the midway position shown in Fig. 3. At this point, actuation of switches 194 and 195 by the compressing panel will cause reversal of the piston movement, resulting in the compressing movement of the ram and loading movement of the hopper into the position shown in Fig. 4. When the mechanism reaches this position pawls 97 will be tripped by rollers 113, releasing the hopper for free downward movement. At the same time, the opening of the cut-off switch 193 will prevent recycling until starting switch 201 is again actuated. In cases where the refuse is deposited at different locations and it is desired to load and compress the material intermittently, the handle 106 is moved into its rearward or non-tripping position. When in this position pawls 97 will not be tripped but will hold the hopper in its upper or closed position until handle 106 is moved into tripping position. When it is desired to dump the entire truckload of material, the hopper 26 is first moved into its closed position by adjustment of handle 106 into non-tripping position and extension and retraction of cylinders 76. Handle 121 is then lifted into its upper position, releasing gate hooks 74 and moving the end gate lifting bars into alignment with the clevises 83. Valve 166 may then be moved into its piston-extending position by actuating rod 203. The entire end gate assembly will then swing upwardly about pivot 25 and will be held in the position shown in Fig. 5 by the fluid pressure. The truck body may then be tilted by actuation of body jack 157 and the material dumped from the body. The truck body may then be lowered and the end gate moved to its lower position by actuating valve 166 in the opposite direction. It will be noted that the electrical system for controlling valve 166 will be inactive during the entire dumping operation, since the compressing panel 27 will not move relative to its associated switches which are mounted on the end gate.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

I claim:

1. In a device for loading and compressing loose material into an enclosed compartment, a hopper mounted adjacent an opening of said compartment and movable between a material-receiving position and a material-loading position, a compressing panel adjacent said hopper and movable between a retracted position and a compressing position; and operating means for said hopper and compressing panel, said operating means comprising a linkage interconnecting said hopper and compressing panel for coordinated relative movement, one portion of said linkage being connected to said hopper for moving the hopper from its receiving position partially toward its loading position when said compressing panel is moved from its compressing position into its retracted position, and a second portion of said linkage being engageable with said hopper to complete its movement into loading position when said compressing panel is returned to its compressing position.

2. In a device for loading and compressing loose material into an enclosed compartment, a hopper mounted adjacent an opening of said compartment and movable between a material-receiving position away from said opening and a material-loading position facing said opening, a compressing panel adjacent said hopper and movable between a retracted position away from said opening and a compressing position substantially covering said opening; and operating means for said hopper and compressing panel, said operating means comprising an actuating element connected to said hopper, and a linkage interconnecting said hopper and compressing panel for coordinated relative movement, one portion of said linkage being connected to said hopper actuating element for moving the hopper from its receiving position partially toward its loading position when said compressing panel is moved from its compressing position into its retracted position, and a second portion of said linkage being engageable with said hopper to complete its movement into loading position when said compressing panel is returned to its compressing position.

3. In a device for loading and compressing material into a compartment, a hopper pivotally mounted adjacent an opening of said compartment and having a material-receiving portion of concave arcuate shape, said hopper being movable between a lower position in which said receiving portion is exposed and an upper position in which said receiving portion faces said opening, and a compressing panel pivotally mounted adjacent said opening above the hopper pivot axis and movable between a retracted position and a compressing position, one edge of said panel being adapted to adjoin one end of the concave portion of said hopper when the latter is brought to a position intermediate its receiving and loading positions, the relative positions of the pivot axes of said hopper and compressing panel being such that said one end of the hopper arcuate portion is closer to said compressing panel pivot axis than the other end thereof when the hopper is in its intermediate position, whereby the hopper is capable of continued movement toward its loading position as the compressing panel sweeps across said arcuate portion toward its compressing position.

4. In a device for loading and compressing loose material into an enclosed compartment, a hopper pivotally mounted adjacent an opening of said compartment and having a material-receiving portion of concave shape and an arcuate portion concentric with the hopper pivot axis, said hopper being movable between a lower position in which said receiving portion is exposed and an upper position in which the receiving portion faces said opening; and a compressing panel pivotally mounted adjacent said opening and movable between a retracted position and a compressing position, said panel having a lip adapted to sweep across said hopper receiving portion when the panel is moved from its retracted to its compressing position, said hopper arcuate portion being in adjoining relation with said lip when the panel is in its compressing position, whereby said lip sweeps across said arcuate portion when the hopper is moved from its loading to its receiving position.

5. In a vehicle body for loading, compressing and dumping loose material, an end gate mounted on said vehicle body and movable between a closed and a dumping position, a hopper supported by said end gate and movable between a receiving and a loading position, a compressing panel supported by said end gate adjacent said hopper and movable between a retracted and a compressing position; and operating means for said end gate, hopper, and compressing panel, said operating means comprising an extensible and retractable actuating element supported by said vehicle body, a loading and compressing linkage connecting said actuating element with said hopper and compressing panel for actuating these two members in coordinated relation between their respective positions when said end gate is in its closed position, and a dumping linkage adapted to connect said actuating element with said end gate for moving the gate from its closed to its dumping position.

6. The combination according to claim 5, further provided with latching means for holding said end gate in its closed position, and an interlocking member connecting said latching means and said dumping linkage, said interlocking member being adjustable between a latching position in which said end gate is latched in closed position and said dumping linkage is in inoperative position, and a releasing position in which the end gate is unlatched and the dumping linkage is in operative position.

7. In a vehicle body for loading, compressing and dumping loose material, an end gate mounted on said vehicle body, a hopper supported by said end gate and movable between a receiving and a loading position, a compressing panel supported by said end gate adjacent said hopper and movable between a retracted and a compressing position, and operating means for said compressing panel and hopper comprising an extensible and retractable actuating element supported by said vehicle body, a rocker arm secured to said compressing panel and connected with said actuating element, a floating arm adjacent said rocker arm and connected with said hopper, and a dog engageable with said floating arm when the rocker arm is actuated in a direction to retract said compressing panel, whereby said floating arm will be moved by said dog in a direction to move said hopper toward its loading position.

8. The combination according to claim 7, further provided with a side housing integral with said end gate, said actuating element comprising a hydraulic cylinder and piston pivotally supported by said vehicle body and disposed within said side housing.

9. In a vehicle body for loading, compressing and dumping loose material, an end gate mounted on said vehicle body, a hopper supported by said end gate and movable between a receiving and a loading position, a compressing panel pivotally supported by said end gate and movable between a compressing and a retracted position; and operating means for said hopper and compressing panel, said operating means comprising an extensible and retractable actuating element supported by said vehicle body and connected with said compressing panel, the compressing panel being moved to its retracted position when said actuating element is extended, a floating arm adjacent said compressing panel and connected with said hopper, a dog engageable with said floating arm during the compressing panel retracting movement to move said hopper from its receiving position partially toward its loading position, and hopper gripping means movable with said compressing panel independently of said floating arm and engageable with said hopper when said actuating mechanism reaches its fully extended position, whereby subsequent retraction of the actuating means will move said compressing panel back to its compressing position and will simultaneously complete the movement of said hopper into its loading position.

10. The combination according to claim 9, said hopper gripping means comprising a pawl having a hook engageable with a portion of said hopper, tripping means in the path of movement of said pawl to disengage the hook from said hopper when the hopper reaches its loading position, and manually adjustable means for moving said tripping means from its tripping position.

11. In a vehicle body for loading and compressing loose material, a hopper pivotally supported adjacent an opening in said body and movable between a receiving and a loading position, a compressing panel supported adjacent said hopper and movable between a retracted and a compressing position, and operating means for said hopper and compressing panel comprising an extensible and retractable actuating element supported by said body and connected with said compressing panel, the compressing panel being moved to its retracted position when said actuating element is extended, first connecting means between said actuating element and said hopper and operable when the actuating element is being extended to move the hopper from its receiving partially toward its loading position, and second connecting means between the actuating element and the hopper and operable when the actuating element is being retracted to complete the hopper movement into loading position.

12. The combination according to claim 11, further provided with a releasing member mounted adjacent said hopper and engageable with a portion of said second connecting means when said hopper reaches its loading position to release the hopper, whereby the hopper will drop back into its receiving position.

13. In combination with an enclosed truck body for receiving loose material, an end gate mounted at an opening in said body, a hopper pivoted to said end gate and movable between a receiving and a loading position, the pivot axis of said hopper being approximately at the level of the lower edge of said opening, an arcuate portion on said hopper concentric with said hopper pivot, said arcuate portion being adjacent the rear edge of said truck body floor and extending upwardly and rearwardly therefrom in a curved fashion a substantial distance above said lower edge, and a compressing panel pivoted to said end gate above said hopper and movable between a retracted position extending rearwardly from said opening and a compressing position across said opening, the outer edge of said compressing panel when in its compressing position being in adjacent relation with the upper portion of said hopper arcuate portion, whereby the compressing movement of said panel takes place a substantial distance above said truck body floor.

14. In combination with an enclosed truck body for receiving loose material, an end gate pivotally mounted at an opening of said body, said end gate being movable between a lower position covering said opening and an upper position extending rearwardly of said opening, a pair of housings on opposite sides of said end gate, a hopper pivoted to said end gate between said side housings and movable between a lower receiving position and an upper loading position, a compressing panel pivoted to said end gate between said side housings above said hopper and movable between an upper retracted position and a lower compressing position, a piston-and-cylinder actuating element within each of said side housings and supported by said truck body, a loading and compressing linkage in each of said side housings between the actuating elements and said hopper and compressing panel for moving these members between their operative positions in coordinated relation, a dumping linkage in each of said side housings between the actuating elements and said end gate for moving the end gate to its upper position, and an interlocking mechanism in each of said side housings and engageable both with said truck body and said dumping linkage, said interlocking mechanism being adapted to latch said end gate in its closed position or alternatively to enable said dumping linkage to operate the end gate.

15. The combination according to claim 14, further provided with an actuating handle on one of said side housings for controlling the interlocking mechanism within that housing, and a shaft extending between said side housings and connecting said interlocking mechanisms, whereby said handle controls the interlocking mechanism in both of said housings.

16. The combination according to claim 14, further provided with a shaft extending between said side housings and connecting said interlocking mechanism, and a buffer on said hopper and engageable with said shaft when the hopper drops to its receiving position.

17. The combination according to claim 14, said hopper being further provided with a cam element integral therewith, said cam being in obstructing relation with a portion of said interlocking mechanism when said hopper is moved away from its loading position, whereby said interlocking mechanism is prevented from unlatching said end gate.

18. In combination with an enclosed truck body for receiving loose material, an end gate pivotally mounted at an opening of said body, said end gate being movable between a lower position covering said opening and an upper position extending rearwardly of said opening, a pair of housings on opposite sides of said end gate, a hopper pivoted to said end gate between said side housings and movable between a lower receiving position and an upper loading position, a compressing panel pivoted to said end gate between said side housings above said hopper and movable between an upper retracted position and a lower compressing position, a piston-and-cylinder actuating element within each of said side housings and supported by said truck body, a loading and compressing linkage in each of said side housings between the actuating elements and said hopper and compressing panel for moving these members between their operative positions in coordinated relation; and a dumping linkage in each of said side housings between the actuating elements and said end gate for moving the end gate to its upper position, said dumping linkage comprising a lifting bar within each side housing and pivotally secured to said end gate, said bar being movable between an operative position in alignment with said actuating element and an inoperative position out of alignment therewith, a cam for moving each bar between its said positions, and a handle extending from said end gate for adjusting said cams.

19. In combination with a truck body having a rear end opening for receiving and dumping loose material, an end gate pivoted below the top edge of said opening and movable between a closed position and a lifted dumping position, said top edge being spaced forwardly from the top of said end gate, a roof plate pivoted to said end gate and slidable on said top edge of the body opening, a compressing panel mounted on said end gate and movable between a retracted position and a compressing position closing said end gate, and actuating means connected between the truck body and end gate for lifting the end gate when said compressing panel is in closed position, said end gate and compressing panel being above the level of said roof plate when the gate reaches its dumping position.

20. In combination with a truck body for conveying loose material, a hopper mounted adjacent an opening of said body and movable between a receiving and a loading position, a compressing panel mounted adjacent said hopper and movable between a retracted and a compressing position, extensible and retractable power actuating means for moving said hopper and compressing panel between their said positions, and electrical control means for controlling the movement of said actuating means, said control means comprising a manually controlled starting circuit connected to the power supply of said actuating means for initiating movement of the actuating means in one direction, and a reversing circuit connected to said power supply and energized when said compressing panel reaches its retracted position to reverse the movement of said actuating means.

21. In combination with a truck body for conveying loose material, a hopper and a compressing panel pivotally mounted at an opening of said truck body, a linkage for moving said hopper from a receiving position partially toward a loading position and simultaneously moving said compressing panel from a compressing position to a retracted position, a reciprocable hydraulic actuating element for operating said linkage through said movement when the element is actuated in a first direction, said linkage moving said compressing panel to its compressing position and completing said hopper movement to its loading position when the element is actuated in the opposite direction, a fluid pressure source for said actuating element, a valve controlling the flow of said fluid and movable between a first position for actuating said element in its first direction and a second position for actuating said element in its opposite direction, a first solenoid for moving the valve into its first position, a second solenoid for moving the valve into its second position, a first energizing circuit for said first solenoid, a second energizing circuit for said second solenoid, a pair of switches actuatable by said packer when it reaches its packing position to close said first circuit and to open said second circuit, and a pair of switches actuatable by said compressing panel when it reaches its retracted position for opening said first circuit and closing said second circuit.

22. The combination according to claim 21, further provided with a stop switch actuatable by said compressing panel in its compressing position to deenergize said first circuit, a bypass circuit for said stop switch, and a manually operable starting switch in said bypass circuit.

23. In a vehicle body for loading, packing and dumping loose material, an end gate mounted on said vehicle body and movable between a closed and a dumping position, a material receiving hopper supported by said end gate, a compressing panel supported by said end gate adjacent said hopper and movable between a retracted and a compressing position; and operating means for said end gate and compressing panel, said operating means including an extensible and retractable actuating element supported by said vehicle body, a compressing linkage connecting said actuating element with said compressing panel for actuating the compressing panel between its retracted and compressing positions, and a dumping linkage adapted to connect said actuating element with said end gate for moving the gate from its closed to its dumping position.

24. In a vehicle body for loading and compressing loose material, a hopper pivotally supported adjacent an opening in said body and movable between a receiving and a loading position, and operating means for said hopper including an extensible and retractable actuating element supported by said body, first connecting means between said actuating element and said hopper and operable when the actuating element is operated in one direction to move the hopper from its receiving partially toward its loading position, and second connecting means between the actuating element and the hopper and operable when the actuating element is operated in the opposite direction to complete the hopper movement into loading position.

25. In a device for loading and compressing material into a compartment, a hopper pivotally mounted adjacent an opening of said compartment and movable between a lower material-receiving position away from said opening and an upper material-loading position feeding material into said opening, and a panel mounted above said hopper, said panel being movable between an upper position away from said opening and a lower position covering said opening and adjoining said hopper at its lower end, the relative sizes of said panel and hopper being such that said hopper overlaps and covers said panel when the hopper is in its upper position whereby the juncture of said panel and hopper is concealed.

26. In a device for loading and compressing material into a compartment, an end gate pivoted at its upper portion to said compartment, said end gate having side walls and an opening leading to the compartment, a hopper pivoted between said side walls and movable between a lower receiving position away from said opening and an upper loading position feeding material into said opening, and a panel pivoted between said side walls above said hopper, said panel being movable between an upper position and a lower position, the panel when in its lower position serving to cover said opening when the hopper is in its receiving position and adjoining said hopper at its lower end, the relative sizes of said panel and hopper being such that said hopper overlaps and covers said panel when the hopper is in its upper position whereby the juncture of said panel and hopper is concealed.

References Cited in the file of this patent

UNITED STATES PATENTS

| Number | Name | Date |
|---|---|---|
| 2,151,887 | Barrett | Mar. 28, 1939 |
| 2,183,813 | Howard et al. | Dec. 19, 1939 |
| 2,229,368 | Wood | Oct. 20, 1942 |
| 2,323,366 | Barrett | July 6, 1943 |
| 2,335,155 | Lee | Nov. 23, 1943 |
| 2,430,973 | Boissonnault | Nov. 18, 1947 |
| 2,496,192 | Baldt | Jan. 31, 1950 |
| 2,511,556 | Wood | June 13, 1950 |
| 2,522,441 | Galloway et al. | Sept. 12, 1950 |
| 2,557,142 | Reitz | June 19, 1951 |
| 2,561,608 | Boissonnault | July 24, 1951 |
| 2,649,216 | Gollnick | Aug. 18, 1953 |